(No Model.)
F. E. YOUNGS.
TOOL HOLDER.
No. 500,834. Patented July 4, 1893.
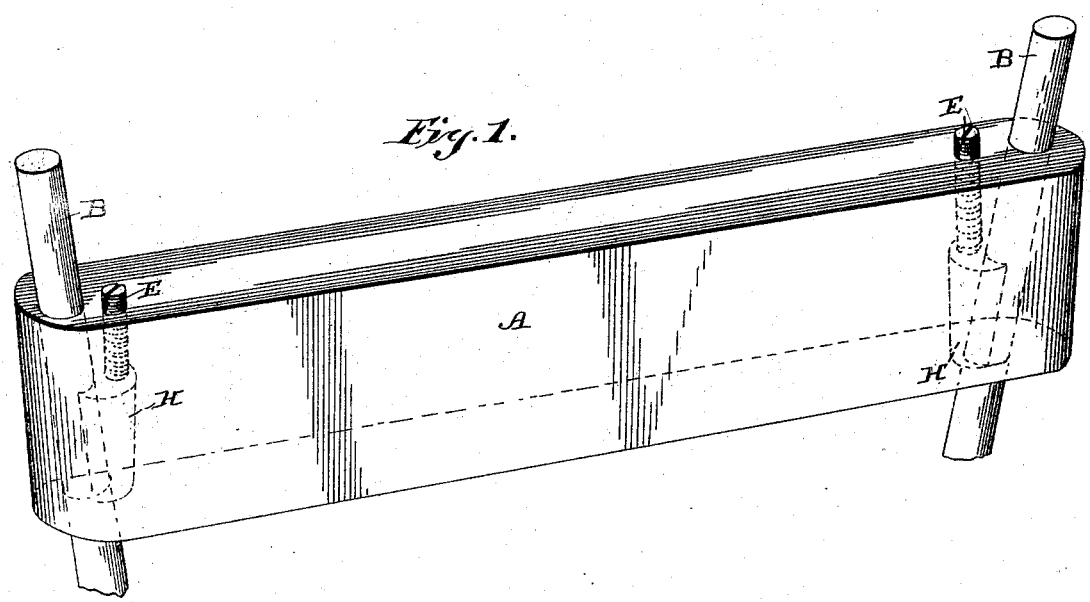
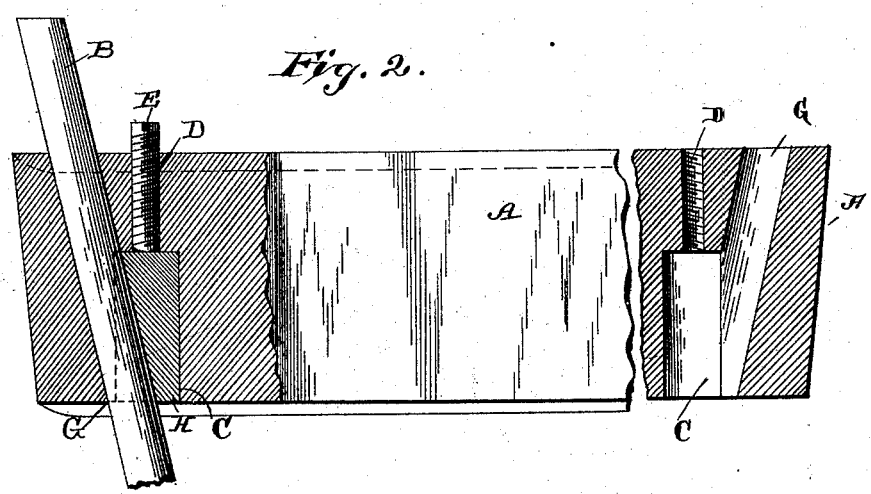
Witnesses—
Geo. E. Frech.
Col. A. Fitzgerald
Inventor—
Fred E. Youngs
per
Inmann Pattison Nesbit
Attys.

UNITED STATES PATENT OFFICE.

FRED E. YOUNGS, OF ALLEGHENY, PENNSYLVANIA.

TOOL-HOLDER.

SPECIFICATION forming part of Letters Patent No. 500,834, dated July 4, 1893.

Application filed July 11, 1892. Serial No. 439,647. (No model.)

*To all whom it may concern:*

Be it known that I, FRED E. YOUNGS, of Allegheny, in the county of Allegheny and State of Pennsylvania, have invented certain new and useful Improvements in Tool-Holders; and I do hereby declare the following to be a full, clear, and exact description of the invention, such as will enable others skilled in the art to which it pertains to make and use it, reference being had to the accompanying drawings, which form part of this specification.

My invention relates to improvements in tool holders, which is especially designed as a lathe or shaper tool holder, while it is also adapted for holding many other forms of tools in which revolving heads or other special holders take the place of the shank here shown, and it consists in the particular construction hereinafter fully described and particularly pointed out in the claim.

The object of my invention is to produce a tool holder of the construction hereinafter shown and described, whereby a very cheap and simple holder is made and in which the tool is securely held against endwise as well as lateral movement, when under heavy pressure.

In the accompanying drawings:—Figure 1 is a perspective view of my invention, the hidden parts being shown in dotted lines. Fig. 2 is a vertical section of the same.

A indicates the shank, in which the tool B is held. For convenience I here show the shank with a tool or cutter B at each end, one extending at a lateral angle for a purpose hereinafter specified, but in practice it is a mere matter of choice whether the shank is provided with one or two tools.

The holder is made thus:—A wedge hole C is bored into the shank or head, from the back side and of a suitable depth, say about two thirds through it. Then from the front side of the shank a screw hole D is bored into the hole C and tapped for a set screw E. I then plug up the wedge hole C with a piece of steel which fits it tightly, and bore a tool hole G entirely through the shank, and at an angle to the wedge hole, which has its rear end run into or communicating with the wedge hole, as plainly shown in Fig. 2. This then forms a wedge H, of the steel plug, which has a tapering side next to the tool hole, and which as will be seen, forms a part of one side of the back end of the tool hole. The wedge is then removed, and slightly ground all around, so that it will not bind in its hole C. I preferably bore the screw hole concentric with and smaller than the wedge hole. However, it will be readily understood that the screw hole could be formed eccentric to the wedge hole and the screw made to abut against one side of the inner end of the wedge, or the wedge hole may be continued on through the shank, with its front end screw threaded to receive a screw of the same size. By means of this construction, the tool is firmly held in place by a slight turning of the screw against the inner or front end of the wedge, and the tool is also held against slipping under heavy pressure, for the heavier the pressure the tighter the tool is held in place by the action of the wedge which is capable of a longitudinal movement independent of the screw caused by frictional contact thereof with the tool. The holes at the left hand end of the shank show a slight modification, in that they are all bored at a lateral angle to the shank so that the cutting end of the tool is clear of or outside the side and end of the shank, thus producing according to the direction of inclination, either a "right hand" or "left hand" side tool.

The particular advantages arising from this particular form of holder, are the extreme cheapness of manufacture, owing to the fact that the shank can be made of cheap quality steel, and the tool while of the finest quality, can be bought on the market in exact size, thus requiring no labor to finish other than to harden and temper it; the boring of the wedge, screw and tool holes, and the tapping of the screw hole, which completes the holder. Also the tool is held against endwise movement under heavy pressure by reason of the wedge as before stated.

Having thus described my invention, what I claim, and desire to secure by Letters Patent, is—

A tool holder comprising a shank or head having a wedge hole, a holding device entering the inner end of the said hole, a tool hole extending substantially longitudinally and at an angle to the wedge hole and running thereinto at its outer end, a tool in said hole, and a wedge in the wedge hole engaged by the holding device but separate from and capable of having a longitudinal movement independent thereof by frictional contact with the tool, substantially as specified.

In testimony whereof I affix my signature in presence of two witnesses.

FRED E. YOUNGS.

Witnesses:
C. F. HOLDSHIP,
E. T. SAINT.